(12) United States Patent
Kuniya

(10) Patent No.: US 11,316,357 B2
(45) Date of Patent: Apr. 26, 2022

(54) CHARGING CIRCUIT AND ELECTRICAL DEVICE

(71) Applicant: TOSHIBA TEC KABUSHIKI KAISHA, Tokyo (JP)

(72) Inventor: Yoshitaka Kuniya, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 16/930,485

(22) Filed: Jul. 16, 2020

(65) Prior Publication Data

US 2021/0167617 A1 Jun. 3, 2021

(30) Foreign Application Priority Data

Dec. 2, 2019 (JP) ............................. JP2019-218144

(51) Int. Cl.
*H02J 7/00* (2006.01)
*H02J 7/06* (2006.01)
*H02J 7/34* (2006.01)

(52) U.S. Cl.
CPC .............. *H02J 7/0049* (2020.01); *H02J 7/06* (2013.01); *H02J 7/345* (2013.01); *H02J 2207/50* (2020.01)

(58) Field of Classification Search
CPC .................................................. H02J 7/0049
USPC ....................................................... 320/148
See application file for complete search history.

(56) References Cited

U.S. PATENT DOCUMENTS

| 3,919,934 | A | * | 11/1975 | Beery | ........................ B41J 9/38 101/93.29 |
| 5,929,593 | A | | 7/1999 | Eguchi | |
| 5,930,129 | A | * | 7/1999 | Sugimura | ............ H03K 17/223 363/49 |
| 6,489,749 | B1 | * | 12/2002 | Nakashimo | ........... H02J 7/0047 320/134 |
| 9,182,809 | B2 | * | 11/2015 | Kitano | ....................... G06F 1/28 |
| 2002/0101223 | A1 | * | 8/2002 | Sugimura | ............... G05F 1/468 323/265 |
| 2012/0326502 | A1 | * | 12/2012 | Nguyen | .................... H02J 7/02 307/21 |
| 2013/0093242 | A1 | * | 4/2013 | Mok | ....................... H02J 9/005 307/23 |
| 2014/0132209 | A1 | | 5/2014 | Park et al. | |

FOREIGN PATENT DOCUMENTS

JP        2005-224016        8/2005

OTHER PUBLICATIONS

Extended European Search Report for European Patent Application No. 20203297.5 dated Apr. 7, 2021.

* cited by examiner

*Primary Examiner* — Jerry D Robbins
(74) *Attorney, Agent, or Firm* — Amin, Turocy & Watson, LLP

(57) ABSTRACT

According to one embodiment, the charging circuit includes the control unit maintains an ON state of the main switching element by being driven within the predetermined time after power is input to the input unit and stopping the function of the time constant circuit, and when the full charge detection unit detects the fully charged state, the control unit turns off the main switching element by restoring the function of the time constant circuit after the predetermined time is elapsed.

16 Claims, 3 Drawing Sheets

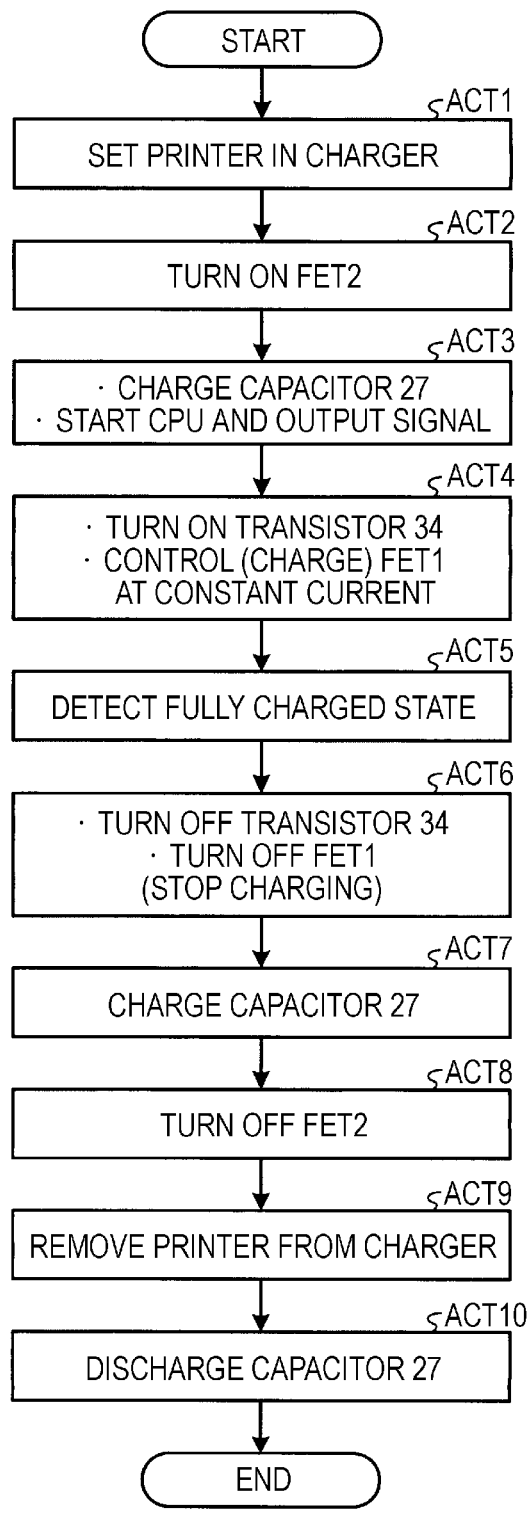

CHARGING CIRCUIT AND ELECTRICAL DEVICE

CROSS-REFERENCE TO RELATED APPLICATION

This application is based upon and claims the benefit of priority from Japanese Patent Application No. P2019-218144, filed on Dec. 2, 2019 the entire contents of which are incorporated herein by reference.

FIELD

Embodiments described herein relate generally to a charging circuit and an electrical device.

BACKGROUND

Currently, an electrical device in which a secondary battery is driven as a power supply is used in many fields. In a charging circuit in the electrical device, a charging current is stopped after the end of charging. However, a so-called standby power is generated from a charging control unit or the like after the stop.

As a device in which the standby power is reduced, a charging device that stops a power supply circuit input to a charging circuit when detecting a fully charged state is known (JP-A-2005-224016). However, in the charging device described in JP-A-2005-224016, it is necessary that a plug of the charging device is pulled out once and then is inserted again in order to restore the stopped power supply circuit. That is, it is necessary that the plug of the charging device is connected again for charging, and the operability for charging is not excellent. Therefore, it is desired to reduce the standby power of a charging control unit without deterioration in the operability for charging.

DESCRIPTION OF THE DRAWINGS

FIG. 3 is a chart illustrating an operation of the charging circuit according to the embodiment.

DETAILED DESCRIPTION

Figure 1:
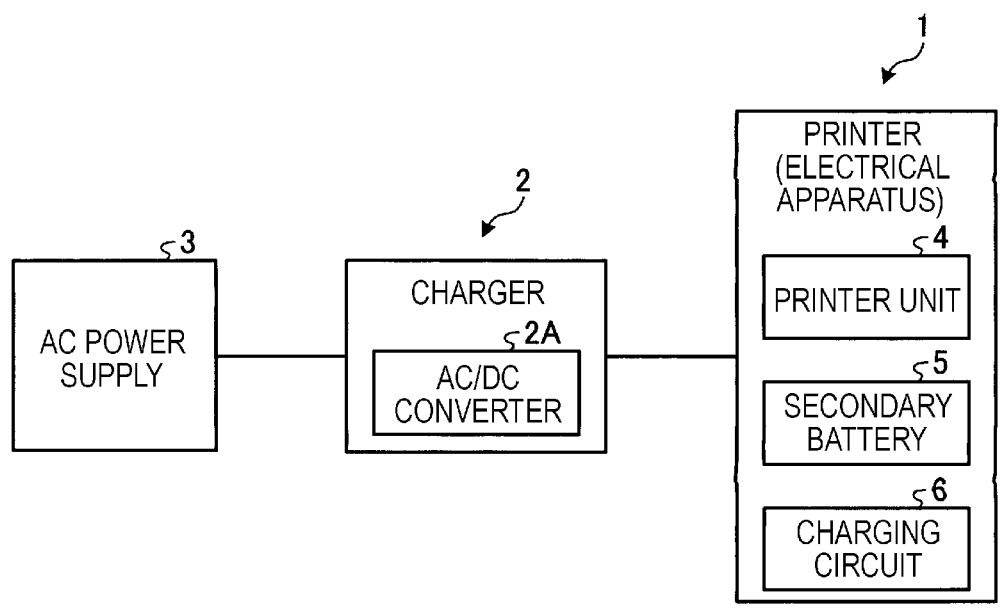
FIG. 1 is a diagram illustrating a relationship between a charger and a printer according to an embodiment.

In general, according to embodiments, there are provided a charging circuit in which standby power of a charging control unit can be reduced without deterioration in operability for charging, and an electrical device.

A charging circuit according to one embodiment includes: an input unit into which power for charging a secondary battery is input; a charging control unit configured to be driven with power supplied from the input unit to control a charging current that is applied to the secondary battery, the charging control unit being connected to a power line ranging from the input unit to the secondary battery; a main switching element configured to be turned on in a state where a potential difference between the input unit and a gate terminal is higher than or equal to a set value, the main switching element being provided on the input unit side of the power line further than the charging control unit; a time constant circuit having a function of maintaining the potential difference at the set value or higher for a predetermined time after power is input to the input unit and a function of maintaining the potential difference at lower than the set value after the predetermined time is elapsed; a control unit configured to be driven with power supplied from the input unit to control the main switching element, the control unit being connected to the secondary battery side of the power line further than the main switching element; and a full charge detection unit configured to detect a fully charged state of the secondary battery, in which the control unit maintains an ON state of the main switching element by being driven within the predetermined time after power is input to the input unit and stopping the function of the time constant circuit, and when the full charge detection unit detects the fully charged state, the control unit turns off the main switching element by restoring the function of the time constant circuit after the predetermined time is elapsed. A charging method according to one embodiment involves inputting power for charging a secondary battery into an input component; driving, by a charging controller, with power supplied from the input component to control a charging current that is applied to the secondary battery, the charging controller being connected to a power line connecting the input component to the secondary battery; turning on, by a main switching element, in a state where a potential difference between the input component and a gate terminal is higher than or equal to a set value, the main switching element being provided on the input component side of the power line further than the charging control unit; maintaining, by a time constant circuit, the potential difference at the set value or higher for a predetermined time after power is input to the input component and maintaining the potential difference at lower than the set value after the predetermined time is elapsed; driving, by a controller, with power supplied from the input component to control the main switching element, the controller being connected to the secondary battery side of the power line further than the main switching element; and detecting, by a full charge detector, a fully charged state of the secondary battery, wherein the controller maintains an ON state of the main switching element by being driven within the predetermined time after power is input to the input component and stopping the time constant circuit, and when the full charge detector detects the fully charged state, the controller turns off the main switching element by restoring the time constant circuit after the predetermined time is elapsed.

Hereinafter, a charging circuit according to an embodiment and an electrical device including the charging circuit will be described with reference to the drawings by using a printer as an example. In FIG. 1, reference numeral 1 represents a printer, reference numeral 2 represents a charger, and reference numeral 3 represents an AC commercial power supply.

The printer 1 is a mobile thermal printer and includes: a printer unit 4 (load) including a thermal head that performs printing, a conveyance mechanism that conveys a printing medium, and the like; a secondary battery 5 that functions as a power supply of the printer unit 4; and a charging circuit 6 for charging the secondary battery 5. The charger 2 detachably holds the printer 1 and charges the secondary battery 5. The charger 2 is connected to the AC commercial power supply 3 and includes an AC/DC converter 2A that converts an alternating current power supply into a direct current power supply.

Figure 2:
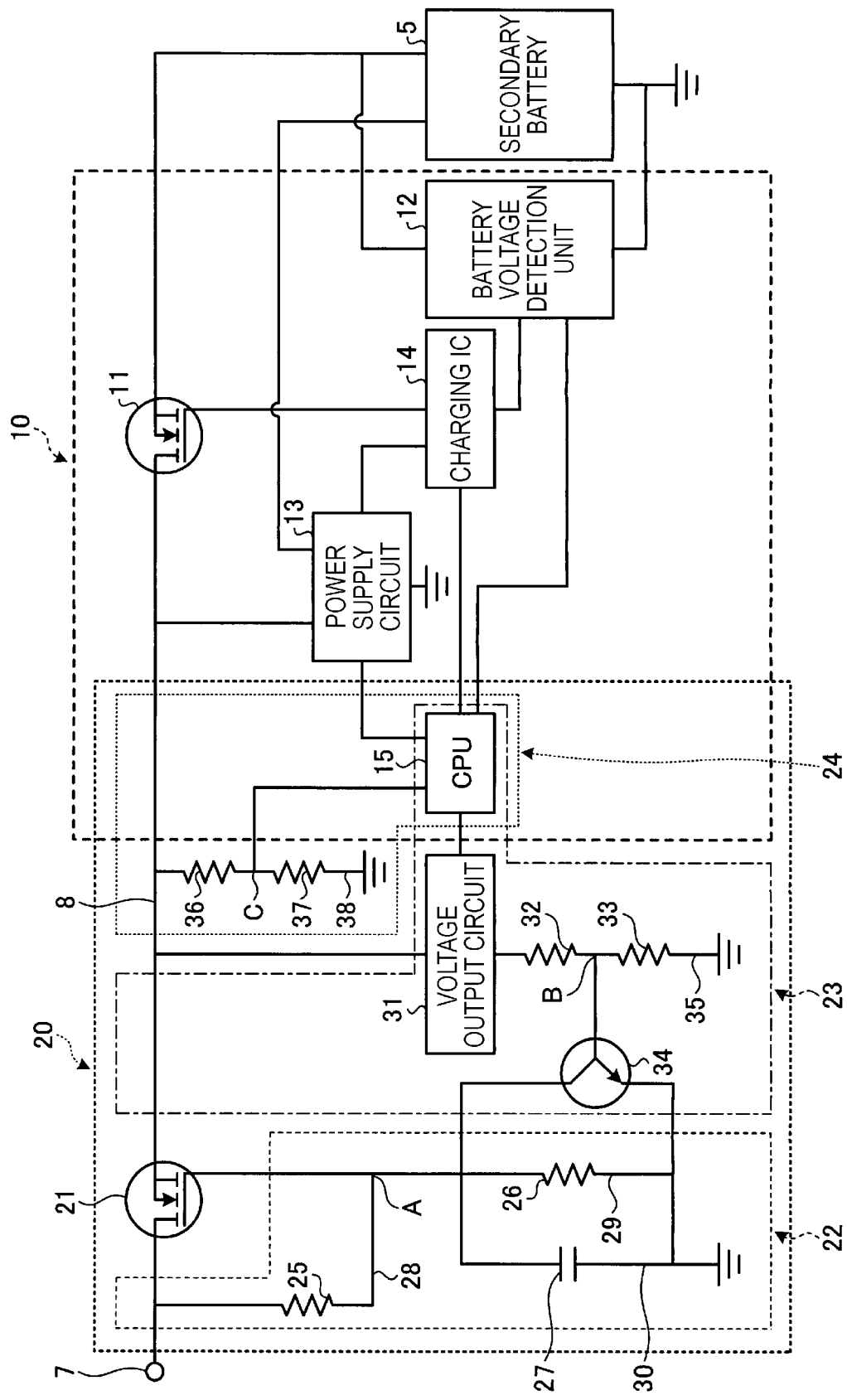
FIG. 2 is a diagram illustrating a charging circuit included in the printer according to the embodiment.

FIG. 2 is a diagram illustrating the charging circuit 6 for charging the secondary battery 5. The charging circuit 6 includes: an input unit 7 into which power is input from the charger 2; a charging control unit 10 that controls a charging current to be supplied to the secondary battery 5; and a low power control unit 20 that reduces power consumption of the charging control unit 10 when the secondary battery 5 is in a fully charged state.

The charging control unit 10 includes: a first FET 11 that is provided on a power line 8 connected to the input unit 7; a battery power detection unit 12 that is connected to both ends of the secondary battery 5; a charging integrated circuit (IC) 14 that operates by receiving the supply of power from the power supply circuit 13; and a central processing unit (CPU) 15 that also operates by receiving the supply of power from the power supply circuit 13.

In the first FET 11, a drain is connected to the power line 8 on the input unit 7 side, a source is connected to the power line 8 on the secondary battery 5 side, and a gate is connected to the charging IC 14. The ON and OFF of the first FET 11 are controlled based on an output of the charging IC 14 such that the secondary battery 5 is charged by so-called constant current control in which the charging current to be supplied to the secondary battery 5 is in a constant range. The battery power detection unit 12 detects a battery voltage of the secondary battery 5, and functions as a full charge detection unit that detects a fully charged state of the secondary battery 5 together with the CPU 15. The fully charged state of the secondary battery 5 refers to a state where the secondary battery 5 is at a predetermined set voltage, and the set voltage is appropriately set.

The power supply circuit 13 is connected to the power line 8 and generates a driving power supply of the charging IC 14 and the CPU 15 by receiving power from the input unit 7. The charging IC 14 receives an output from the battery power detection unit 12 and the CPU 15 and outputs a signal to the gate of the first FET 11. The charging IC 14 controls the signal to the gate of the first FET 11 during charging such that the charging current flowing through the secondary battery 5 is a constant current. In addition, the charging IC 14 turns on the first FET 11 based on the signal from the CPU 15 at the start of charging. Further, the charging IC 14 turns off the first FET 11 based on the output from the battery power detection unit 12 at the end of charging. The CPU 15 controls the printer unit 4 by receiving power from the secondary battery 5 when the printer 1 is used. In addition, the CPU 15 also configures a part of the low power control unit 20 described below in detail.

Next, the low power control unit 20 will be described. The low power control unit 20 includes a second FET 21, a time constant circuit 22, a control unit 23, and a power supply detection unit 24. The second FET 21 is a main switching element that switches the supply of power from the input unit 7 to the charging control unit 10. In the second FET 21, a drain is connected to the power line 8 on the input unit 7 side, a source is connected to the power line 8 on the secondary battery 5 side, and a gate is connected to an intermediate point A of the time constant circuit 22.

The time constant circuit 22 maintains the potential difference between the drain and the gate of the second FET 21 at a set value or higher for a predetermined time after power is input to the input unit 7. The time constant circuit 22 includes resistors 25 and 26 and a capacitor 27.

The resistor 25 is provided on a connection line 28 through which the power line 8 between the input unit 7 and the second FET 21 and the intermediate point A between the gate of the second FET 21 and the ground are connected to each other. The resistor 26 is provided on a connection line 29 through which the intermediate point A and the ground are connected to each other. The capacitor 27 is provided on a connection line 30 through which the intermediate point A and the ground are connected to each other, and is connected in parallel to the resistor 26.

When the power supply detection unit 24 detects a change from a state where power is not input to the input unit 7 to a state where power is input to the input unit 7, the control unit 23 maintains the ON state of the second FET 21. When the battery power detection unit 12 or the like detects the fully charged state of the secondary battery 5, the control unit 23 turns off the second FET 21. The control unit 23 includes the CPU 15, a voltage output circuit 31, resistors 32 and 33, and a digital transistor 34.

The CPU 15 is connected to the voltage output circuit 31 and controls an output of the voltage output circuit 31. The voltage output circuit 31 is connected to the ground through resistors 32 and 33 that are connected in series to the connection line 35. The digital transistor 34 is connected in parallel to the capacitor 27 and the resistor 26. The gate of the digital transistor 34 is connected to an intermediate point B of the connection line 35 between the resistors 32 and 33.

The power supply detection unit 24 detects a change from a state where power is not input to the input unit 7 to a state where power is input to the input unit 7. The power supply detection unit 24 includes the CPU 15 and the resistors 36 and 37. The resistors 36 and 37 are connected in series to a connection line 38 through which the power line 8 and the ground are connected to each other. An intermediate point C between the resistors 36 and 37 is connected to the CPU 15.

Next, an operation of the charging circuit 6 will be described with reference to FIG. 3. When the secondary battery 5 is charged, a user sets the printer 1 on the charger 2 (ACT 1). As a result, the input unit 7 is connected to an output unit (not illustrated) of the charger 2. Thus, power is input to the input unit 7 such that the second FET 21 is turned on (ACT 2). Specifically, for example, a voltage of 19 V that is dropped by the charger 2 is applied between the input unit 7 and the ground, a potential difference of a set value or higher is generated between the drain and the gate of the second FET 21, and the second FET 21 is turned on.

When power is input to the input unit 7, a current flows through the time constant circuit 22, and the charging of the capacitor 27 starts. During the charging of the capacitor 27, the potential of the intermediate point A is low, and the potential difference between the drain and the gate of the second FET 21 is maintained at a set value or higher. Therefore, the second FET 21 is maintained in the ON state. The CPU 15 starts during the charging of the capacitor 27 and outputs a signal to each of the voltage output circuit 31 and the charging IC 14 (ACT 3).

When the voltage output circuit 31 starts based on the signal of the CPU 15, a current flows through the resistors 32 and 33, and the potential of the intermediate point B increases. As a result, a potential difference is generated between a base and an emitter of the digital transistor 34, and the digital transistor 34 is turned on. Concurrently, the charging IC 14 that receives the signal from the CPU 15 charges the secondary battery 5 by controlling the first FET 11 at a constant current (ACT 4). The CPU 15 starts the voltage output circuit 31 during the charging of the secondary battery 5 to maintain the digital transistor 34 in the ON state. Therefore, a current flowing through the resistor 26 and the capacitor is biased, and a state where the potential of the intermediate point A is low is maintained. The second FET 21 charges the secondary battery 5 while maintaining the ON state. That is, by turning on the digital transistor 34, the CPU 15 stops the function of the time constant circuit 22 of maintaining the voltage between both ends of the capacitor 27 at the set voltage value after a predetermined time is elapsed from the start of the charging of the capacitor 27.

When the full charge detection unit detects the fully charged state of the secondary battery 5 during the charging of the secondary battery 5, the CPU 15 stops the output to the voltage output circuit 31. That is, when the CPU 15 receives the input from the battery power detection unit 12 and determines that the secondary battery 5 is in the fully charged state, the CPU 15 stops the output to the voltage output circuit 31. As a result, the potential of the intermediate point B between the resistors 32 and 33 decreases, the potential difference between the base and the emitter of the digital transistor 34 is eliminated, and the digital transistor 34 is turned off. In addition, at this time, the charging IC 14 turns off the FET1 (ACT 6).

As a result, the function of the time constant circuit 22 is restored, the charging of the capacitor 27 starts (ACT 7), and the potential of the intermediate point A of the time constant circuit 22 increases. After the set predetermined time is elapsed in the time constant circuit 22, the voltage difference between the drain and the gate of the second FET 21 is lower than set value, and the second FET 21 is turned off (ACT 8). As a result, the power supply of the charging control unit 10 is interrupted. Accordingly, the charging circuit 6 can prevent standby power from being generated by the charging control unit 10 even in a state where the printer 1 is set in the charger 2 after the end of charging of the secondary battery 5.

When the user removes the printer 1 from the charger 2 after the end of charging of the secondary battery 5 (ACT 9), the capacitor 27 is discharged (ACT 10), and the charging circuit 6 enters an initial state where the printer 1 is not yet set (ACT 1). Specifically, when the printer 1 is removed from the charger 2, the input to the input unit 7 is eliminated, charge stored in the capacitor 27 is discharged through the resistor 26. Next, when the secondary battery 5 of the printer 1 is charged, the above-described operations of ACT 1 to ACT 10 are repeated.

As described above, in the charging circuit 6 according to the embodiment, the supply of power to the charging control unit 10 is interrupted after secondary battery 5 enters the fully charged state and charging ends. Therefore, power consumption by the charging control unit 10 can be eliminated even in a state where the printer is set in the charger 2 as it is after the end of charging of the secondary battery 5.

In addition, in the charging circuit 6 according to the embodiment, when the power supply detection unit 24 detects a change from a state where power is not input to the input unit 7 to a state where power is input to the input unit 7, the control unit 23 maintains the ON state of the second FET 21. Therefore, when the printer 1 is set in the charger 2, the second FET 21 is maintained in the ON state, and the secondary battery 5 can be charged. Accordingly, even when the second FET 21 is turned off to remove the power consumption of the charging control unit 10 after the end of charging, simply by setting the printer 1 in the charger 2 to charge the secondary battery 5 again, the second FET 21 is maintained in the ON state, and the secondary battery 5 can be charged. Therefore, the operability for charging the secondary battery 5 can be improved.

One characteristic of the charging circuit 6 according to the embodiment is that, as a method of reducing power consumption of the charging control unit 10 and preventing deterioration in operability, the second FET 21 is controlled by using a combination of the time constant circuit 22 and the CPU 15. Specifically, the second FET 21 is maintained in the ON state during charging by the output of the CPU 15, and the second FET 21 is maintained in the OFF state by the time constant circuit 22 after the end of charging. With this configuration, the second FET 21 is maintained in the ON state after power is input to the input unit 7. After the end of charging of the secondary battery 5, the second FET 21 can be maintained in the OFF state by the time constant circuit 22 although the control unit 23 does not receive the supply of power and is not driven.

In addition, another CPU or the like for maintaining the second FET 21 in the OFF state after the end of charging of secondary battery 5 is not provided. Therefore, the power consumption of the charging circuit 6 as a whole can be reduced. A small amount of power is consumed in the time constant circuit 22 after the end of charging of the secondary battery 5. However, this power is extremely small as compared to standby power by the CPU 15 or the like, and the power consumption of the charging circuit 6 as a whole can be sufficiently reduced. In addition, the charging circuit 6 according to the embodiment is provided in the printer 1. Therefore, the CPU 15 that performs various controls of the printer unit 4 can also be used as the control unit of the charging circuit 6, and the configuration of the control unit of the printer 1 can be simplified.

In the embodiment, the charging circuit 6 is provided in the printer 1 as an electrical device. However, the charging circuit 6 can also be provided in the charger 2. In addition, in the embodiment, the printer 1 is described as an electrical device, but the electrical device is not limited thereto. The electrical device is not particularly limited as long as a secondary battery such as a smartphone or a headphone is used therein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charging circuit, comprising:
   an input component into which power for charging a secondary battery is input;
   a charging controller configured to be driven with power supplied from the input component to control a charging current that is applied to the secondary battery, the charging controller being connected to a power line connecting the input component to the secondary battery;
   a main switching element configured to be turned on in a state where a potential difference between the input component and a gate terminal is higher than or equal to a set value, the main switching element being provided on the power line between the input component and the charging control unit;
   a time constant circuit having a function of maintaining the potential difference at the set value or higher for a predetermined time after power is input to the input component and a function of maintaining the potential difference at lower than the set value after the predetermined time is elapsed;
   a controller configured to be driven with power supplied from the input component to control the main switching element, the controller being connected to the power line between the secondary battery and the main switching element; and a full charge detector configured to detect a fully charged state of the secondary battery, wherein the controller maintains an ON state of the main switching element by being driven within the predetermined time after power is input to the input component and stopping the function of the time constant circuit, and when the full charge detector detects the fully charged state, the controller turns off the main switching element by restoring the function of the time constant circuit after the predetermined time is elapsed.

2. The circuit according to claim 1, wherein the time constant circuit includes a resistor and a capacitor, the resistor being provided on a connection line through which the power line that is provided on the input component side further than the main switching element and a wiring that leads from the gate to a ground are connected to each other, and the capacitor being connected to a connection line through which a connection point between the wiring and the connection line and the ground are connected to each other, and the controller includes a control switching element that is provided parallel to the capacitor.

3. An electrical device, comprising:

a charging circuit, comprising:
 an input component into which power for charging a secondary battery is input;
 a charging controller configured to be driven with power supplied from the input component to control a charging current that is applied to the secondary battery, the charging controller being connected to a power line connecting the input component to the secondary battery;
 a main switching element configured to be turned on in a state where a potential difference between the input component and a gate terminal is higher than or equal to a set value, the main switching element being provided on the power line between the input component and the charging control unit;
 a time constant circuit having a function of maintaining the potential difference at the set value or higher for a predetermined time after power is input to the input component and a function of maintaining the potential difference at lower than the set value after the predetermined time is elapsed;
 a controller configured to be driven with power supplied from the input component to control the main switching element, the controller being connected to the power line between the secondary battery and the main switching element; and
 a full charge detector configured to detect a fully charged state of the secondary battery; and a load configured to be driven by the secondary battery, wherein the controller maintains an ON state of the main switching element by being driven within the predetermined time after power is input to the input component and stopping the function of the time constant circuit, and when the full charge detector detects the fully charged state, the controller turns off the main switching element by restoring the function of the time constant circuit after the predetermined time is elapsed.

4. The electrical device according to claim 3, wherein the electrical device is a printer.

5. The electrical device according to claim 3, wherein the electrical device is a mobile thermal printer.

6. The electrical device according to claim 3, wherein the time constant circuit includes a resistor and a capacitor, the resistor being provided on a connection line through which the power line that is provided between the input component and the main switching element and a wiring that leads from the gate to a ground are connected to each other, and the capacitor being connected to a connection line through which a connection point between the wiring and the connection line and the ground are connected to each other, and the controller includes a control switching element that is provided parallel to the capacitor.

7. The electrical device according to claim 6, wherein the electrical device is a printer.

8. The electrical device according to claim 6, wherein the electrical device is a mobile thermal printer.

9. A charging method, comprising:

inputting power for charging a secondary battery into an input component;

driving, by a charging controller, with power supplied from the input component to control a charging current that is applied to the secondary battery, the charging controller being connected to a power line connecting the input component to the secondary battery;

turning on, by a main switching element, in a state where a potential difference between the input component and a gate terminal is higher than or equal to a set value, the main switching element being provided on the power line between the input component and the charging control unit;

maintaining, by a time constant circuit, the potential difference at the set value or higher for a predetermined time after power is input to the input component and maintaining the potential difference at lower than the set value after the predetermined time is elapsed;

driving, by a controller, with power supplied from the input component to control the main switching element, the controller being connected to the power line between the secondary battery and the main switching element; and detecting, by a full charge detector, a fully charged state of the secondary battery, wherein the controller maintains an ON state of the main switching element by being driven within the predetermined time after power is input to the input component and stopping the time constant circuit, and when the full charge detector detects the fully charged state, the controller turns off the main switching element by restoring the time constant circuit after the predetermined time is elapsed.

10. The method according to claim 9, further comprising:
 driving, by the secondary battery, a load of an electrical device.

11. The method according to claim 10, wherein the electrical device is a printer.

12. The method according to claim 10, wherein the electrical device is a mobile thermal printer.

13. The method according to claim 9, wherein the time constant circuit includes a resistor and a capacitor, the resistor being provided on a connection line through which the power line is provided between the input component and the main switching element and a wiring that leads from the gate to a ground are connected to each other, and the capacitor being connected to a connection line through which a connection point between the wiring and the connection line and the ground are connected to each other, and the controller includes a control switching element that is provided parallel to the capacitor.

14. The method according to claim 13, further comprising:

driving, by the secondary battery, a load of an electrical device.

15. The method according to claim 14, wherein the electrical device is a printer.

16. The method according to claim 14, wherein the electrical device is a mobile thermal printer.

* * * * *